(12) United States Patent
Jeon

(10) Patent No.: US 9,521,457 B2
(45) Date of Patent: Dec. 13, 2016

(54) TERMINAL, VEHICLE HAVING THE SAME, AND METHOD OF CONTROLLING THE SAME

(71) Applicant: Hyundai Motor Company, Seoul (KR)

(72) Inventor: Youngtak Jeon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/563,437

(22) Filed: Dec. 8, 2014

(65) Prior Publication Data

US 2016/0094882 A1 Mar. 31, 2016

(30) Foreign Application Priority Data

Sep. 25, 2014 (KR) ........................ 10-2014-0128183

(51) Int. Cl.
*H04N 7/18* (2006.01)
*H04N 7/173* (2011.01)
(Continued)

(52) U.S. Cl.
CPC ........... *H04N 21/4516* (2013.01); *G06T 11/60* (2013.01); *H04N 21/2146* (2013.01);
(Continued)

(58) Field of Classification Search
CPC .................. H04N 21/2343; H04N 21/234327; H04N 21/234363; H04N 21/414; H04N 21/41407; H04N 21/41422
(Continued)

(56) References Cited

U.S. PATENT DOCUMENTS

| 7,020,195 B1 * | 3/2006 | McMahon | H04N 5/4401 348/E5.108 |
| 2001/0012322 A1 * | 8/2001 | Nagaoka | H04L 27/2604 375/240 |

(Continued)

FOREIGN PATENT DOCUMENTS

| JP | 2004-304498 | 10/2004 |
| KR | 10-2005-0093397 A | 9/2005 |

(Continued)

OTHER PUBLICATIONS

Office Action for Korean Application No. 10-2014-0128183, with English translation, 17 pages.

*Primary Examiner* — James R Sheleheda
(74) *Attorney, Agent, or Firm* — Mintz Levin Cohn Ferris Glovsky and Popeo, P.C.; Peter F. Corless

(57) ABSTRACT

A terminal, a vehicle having the same, and a method of controlling the same are provided. The terminal includes a display unit, a first communication unit that is configured to receive basic image information, and a second communication unit that configured to receive additional image information. A controller is configured to combine the basic image information and the additional image information, and display an image on the display unit based on the combined image information when resolution supported in the display unit is greater than resolution of the basic image information. A broadcasting image of high resolution is provided to the user since the resolution of the DMB of the terminal is increased by receiving the additional image information to improve the resolution via a wireless communication network of a predetermined band or greater.

16 Claims, 14 Drawing Sheets

(51) Int. Cl.
  *H04N 21/45* (2011.01)
  *G06T 11/60* (2006.01)
  *H04N 21/41* (2011.01)
  *H04N 21/414* (2011.01)
  *H04N 21/426* (2011.01)
  *H04N 21/431* (2011.01)
  *H04N 21/485* (2011.01)
  *H04N 21/2343* (2011.01)
  *H04N 21/214* (2011.01)
  *H04N 21/262* (2011.01)
  *H04N 21/643* (2011.01)

(52) U.S. Cl.
  CPC ............ *H04N 21/234327* (2013.01); *H04N 21/234363* (2013.01); *H04N 21/26216* (2013.01); *H04N 21/4126* (2013.01); *H04N 21/41407* (2013.01); *H04N 21/41422* (2013.01); *H04N 21/42653* (2013.01); *H04N 21/4316* (2013.01); *H04N 21/4532* (2013.01); *H04N 21/4858* (2013.01); *H04N 21/64315* (2013.01)

(58) Field of Classification Search
  USPC .......................................... 725/74, 75, 77, 95
  See application file for complete search history.

(56) References Cited

U.S. PATENT DOCUMENTS

| | | | |
|---|---|---|---|
| 2006/0268991 A1* | 11/2006 | Segall | H04B 1/66 375/240.24 |
| 2007/0223582 A1* | 9/2007 | Borer | H04N 19/619 375/240.12 |
| 2012/0076204 A1* | 3/2012 | Raveendran | H04N 21/23432 375/240.12 |
| 2013/0016624 A1* | 1/2013 | Li | H04L 41/5009 370/252 |
| 2013/0208792 A1* | 8/2013 | He | H04N 19/00569 375/240.12 |
| 2013/0282917 A1* | 10/2013 | Reznik | H04N 21/4402 709/231 |
| 2014/0211681 A1* | 7/2014 | Chan | H04N 21/6405 370/312 |
| 2014/0341545 A1* | 11/2014 | Petrucci | G11B 27/10 386/262 |
| 2014/0376609 A1* | 12/2014 | Barkley | H04N 7/147 375/240.02 |
| 2015/0043638 A1* | 2/2015 | Sato | H04N 19/51 375/240.12 |
| 2015/0105043 A1* | 4/2015 | Puvvula | H04W 4/26 455/405 |
| 2015/0110172 A1* | 4/2015 | Ye | H04N 19/33 375/240.02 |
| 2015/0256856 A1* | 9/2015 | Tsukuba | H04N 19/70 375/240.25 |
| 2015/0296232 A1* | 10/2015 | Hwang | H04N 21/234327 348/473 |
| 2016/0112577 A1* | 4/2016 | Guday | H04W 24/02 455/406 |
| 2016/0134572 A1* | 5/2016 | Logan | H04L 51/08 709/206 |
| 2016/0135031 A1* | 5/2016 | Bank | H04M 15/7652 455/405 |
| 2016/0179752 A1* | 6/2016 | Clark | G06F 3/167 704/270.1 |

FOREIGN PATENT DOCUMENTS

| | | |
|---|---|---|
| KR | 10-2006-0121508 | 11/2006 |
| KR | 10-0681914 | 2/2007 |
| KR | 10-0681914 B1 | 2/2007 |
| KR | 10-0738930 | 7/2007 |
| KR | 10-2010-0072673 A | 7/2010 |

* cited by examiner

TERMINAL, VEHICLE HAVING THE SAME, AND METHOD OF CONTROLLING THE SAME

CROSS-REFERENCE TO RELATED APPLICATION

This application claims the benefit of Korean Patent Application No. 10-2014-0128183, filed on Sep. 25, 2014 in the Korean Intellectual Property Office, the disclosure of which is incorporated herein by reference.

BACKGROUND

1. Field

The present invention relates to a terminal for watching broadcasting, a vehicle having the same, and a method of controlling the same.

2. Description of the Related Art

A vehicle often includes a cluster configured to display driving functions such as a vehicle speed, an engine revolutions per minute (RPM), a fuel level, cooling water, etc., and vehicle information. Further, the vehicle includes additional functions for user convenience such as an audio function, a video function, a navigation function, air conditioning control, seat control, lighting control, etc. Moreover, the vehicle further includes an audio/video/navigation (AVN) device in which a navigation function, an audio function, and a video function are integrated.

The AVN device of the vehicle is configured to perform a digital multimedia broadcasting (DMB) function of outputting digital multimedia broadcasting. In particular, the DMB function is a broadcasting function of modulating an image signal, an audio signal, etc. by a digital method and providing the modulated signals to a terminal. The DMB function provides a DMB service using a ground wave/satellite, and when a DMB broadcasting center transmits broadcasting program content generated by converting a broadcasting program into digital multimedia data to the ground wave/satellite, receiving the broadcasting program content in the ground wave/satellite, and transmitting the broadcasting program content to a DMB receiver and a gap filler.

The DMB function is provided for a mobile terminal, and since a screen is substantially small due to a feature of the mobile terminal, a substantially low image quality may be satisfactory. However, when the DMB broadcasting having resolution of a quarter video graphic array (QVGA: 320×240) is displayed on a display unit that display an image of the resolution of a video graphic array (VGA: 640×480), the image quality of the DMB broadcasting may be unsatisfactory. In other words, since the resolution provided in a general DMB service is a resolution suitable for performance of the DMB terminal, when the DMB terminal is connected to a large-sized display unit and the resolution of the DMB terminal is applied to the large size display unit as it is without any conversion, the resolution is substantially decreased.

SUMMARY

Therefore, in one aspect the present invention provides a terminal that may be configured to display image information obtained by adding basic image information received by an antenna to additional image information, a vehicle having the same, and a method of controlling the same. In another aspect the present invention provides a terminal configured to display image information obtained by adding basic image information received by an antenna to additional image information transmitted from an external device, a vehicle having the same, and a method of controlling the same. Further, the present invention provides a terminal that may be configured to provide a notification regarding the amount of data of an external device when displaying image information obtained by adding basic image information received by an antenna to additional image information transmitted from the external device, a vehicle having the same, and a method of controlling the same.

Additional aspects of the invention will be set forth in part in the description which follows and, in part, will be obvious from the description, or may be learned by practice of the invention.

In accordance with one aspect of the present invention, a terminal, may include: a display unit; a first communication unit configured to receive basic image information; a second communication unit configured to receive additional image information; and a controller configured to combine the basic image information and the additional image information, and display an image on the display unit based on the combined image information when resolution which is supported in the display unit is greater than resolution of the basic image information.

The controller may be configured to up-sample the basic image information, and perform image processing by combining the additional image information and the up-sampled image information. The additional image information may be image information obtained by subtracting the up-sampled image information from original image information of a server. In addition, the first communication unit may be configured to perform radio frequency (RF) communication, and the second communication unit may be configured to perform third generation (3G) mobile communication, fourth generation (4G, LTE) mobile communication, or wireless fidelity (Wi-Fi) communication which is mobile communication of a predetermined band or greater with a transmitter of a server. The first communication unit may be configured to perform RF communication, and the second communication unit may be configured to perform Bluetooth communication, USB communication, or Wi-Fi access point communication with an external device.

The controller may be configured to compare an amount of data of the additional image information and an amount of data which is available in the external device, and output the amount of compared data. The controller may further be configured to display the image on the display unit based on the basic image information when the amount of data which is available in the external device is less than the amount of the additional image information. The controller may also be configured to display the image on the display unit based on the basic image information when resolution supported in the display unit is equal to or less than that of the basic image information.

In accordance with another aspect of the present invention, a vehicle may include: an antenna that includes a first communication unit configured to communicate with a transmitter that transmits a broadcasting signal, and a second communication unit configured to communicate with the transmitter and perform another communication with the first communication unit; and a terminal configured to receive basic image information and additional image information, perform image processing by combining the basic image information and the additional image information, and display an image that corresponds to the image-processed image information.

The terminal may be configured to up-sample the basic image information, and perform the image processing by combining the additional image information and the up-sample image information. The additional image information may be image information obtained by subtracting the up-sampled image information from original image information of a server. The basic image information may be image information obtained by sub-sampling the original image information.

The first communication unit may be configured to perform RF communication with the transmitter, and the second communication unit may be configured to perform third generation (3G) mobile communication, fourth generation (4G, LTE) mobile communication, or wireless fidelity (Wi-Fi) communication with the transmitter. The terminal may be configured to display the image on a display unit based on the basic image information when resolution supported in the display unit is equal to or less than resolution of the basic image information, and display the image on the display unit based on the image-processed image information when the resolution supported in the display unit is greater than the resolution of the basic image information.

In accordance with still another aspect of the present invention, a vehicle may include: a first communication unit configured to communicate with a transmitter configured to transmit a broadcasting signal; a second communication unit configured to perform communication with an external device, and receive additional image information from the external device; and a terminal configured to perform image processing by combining basic image information and the additional image information, and display an image that corresponds to the image-processed image information.

The terminal may be configured to up-sample the basic image information, and perform the image processing by combining the additional image information and the up-sample image information. The additional image information may be image information obtained by subtracting the up-sampled image information from original image information of a server, and the basic image information may be image information obtained by sub-sampling the original image information.

The first communication unit may be configured to perform RF communication, and the second communication unit may be configured to perform Bluetooth communication, USB communication, or Wi-Fi access point communication with an external device. The terminal may be configured to compare an amount of data of the additional image information and an amount of data which is available in the external device, and output the amount of compared data through the display unit. The terminal may be configured to display the image on the display unit based on the basic image information when the amount of data which is available in the external device is less than the amount of the additional image information. The vehicle may further include an auxiliary display unit disposed on the rear surface of each of a driver seat and a passenger seat and a distributor configured to distribute an image transmitted to the auxiliary display unit.

In accordance with yet another aspect of the present invention, a method of controlling a terminal disposed within a vehicle may include: confirming a resolution of a display unit when a broadcasting watching command is input; displaying an image that corresponds to basic image information when the confirmed resolution is equal to or less than resolution of the basic image information; combining the basic image information and additional image information when the confirmed resolution is greater than the resolution of the basic image information; and displaying an image that corresponds to the combined image information.

The combining of the basic image information and the additional image information may include: up-sampling the basic image information; and combining the additional image information and the up-sampled image information. The basic image information may be information received via RF communication, and the additional image information may be information received via third generation (3G) mobile communication, fourth generation (4G, LTE) mobile communication, or wireless fidelity (Wi-Fi) communication. The basic image information may be information received via RF communication, and the additional image information may be information received via Bluetooth communication, USB communication, or Wi-Fi access point communication with an external device.

The method of controlling the terminal may further include: comparing an amount of data of the additional image information and an amount of data which is available in the external device; and displaying the image that corresponds to the basic image information when the amount of data which is available in the external device is less than the amount of the additional image information.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
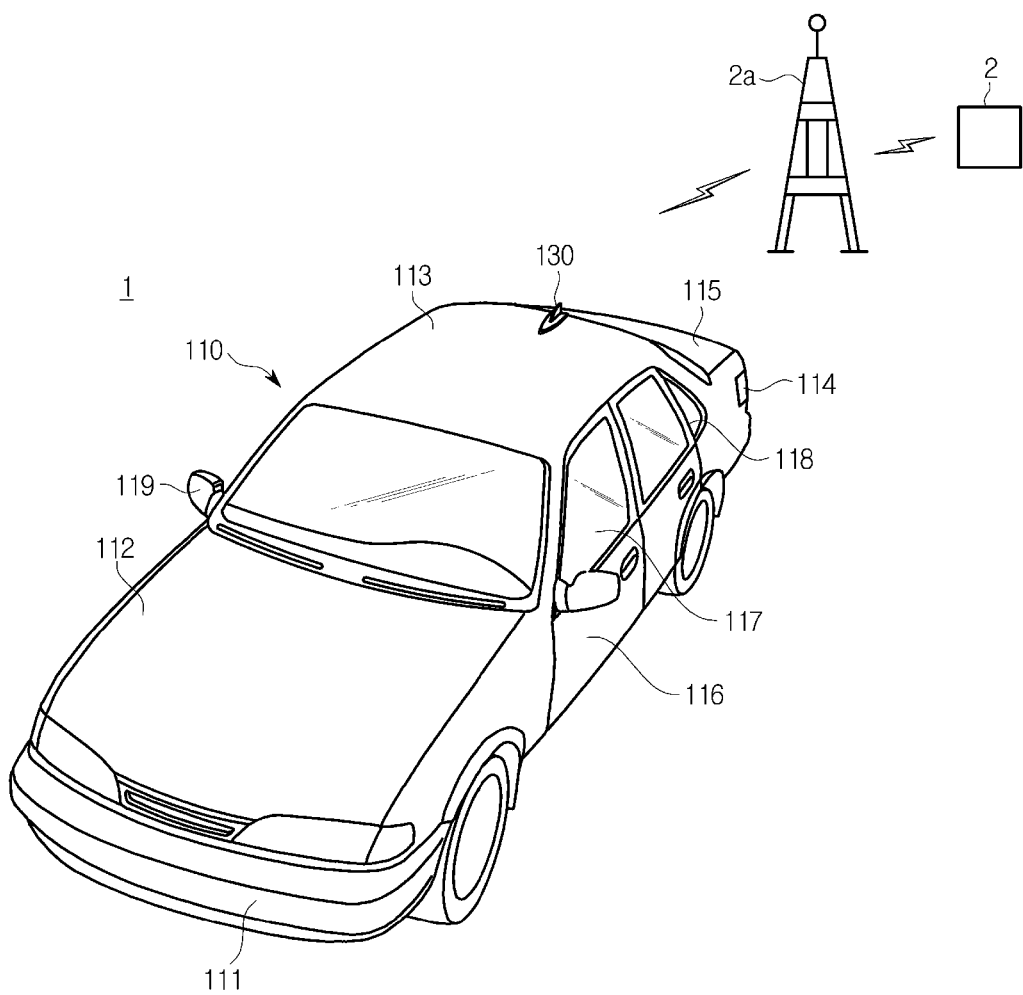
FIG. 1 is an exemplary diagram illustrating a vehicle in which a terminal is provided according to one exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

Figure 2:
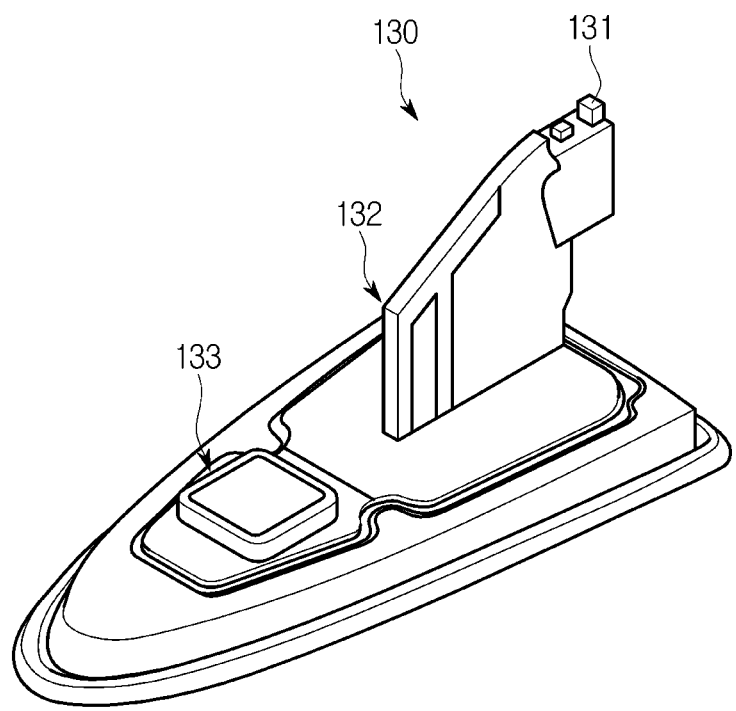
FIG. 2 is an exemplary diagram illustrating an antenna of a vehicle in which a terminal is provided according to an exemplary embodiment of the present invention.
Figure 3:
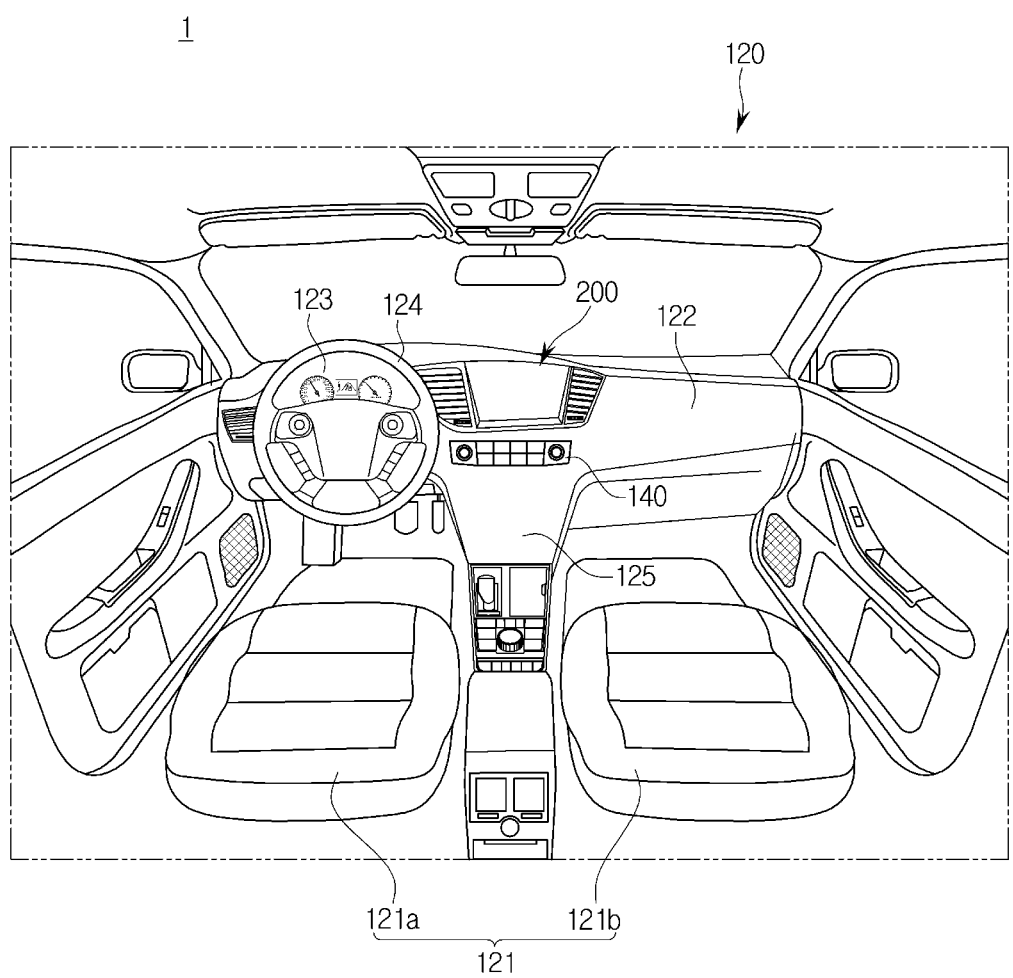
FIG. 3 is an exemplary diagram illustrating the interior of a vehicle in which a terminal is provided according to an exemplary embodiment of the present invention.

FIG. 1 is an exemplary diagram illustrating a vehicle in which a terminal is provided according to one exemplary embodiment of the present invention, FIG. 2 is an exemplary diagram illustrating an antenna of a vehicle in which a terminal is provided according to an exemplary embodiment of the present invention, and FIG. 3 is an exemplary diagram illustrating the inside of a vehicle in which a terminal is provided according to an exemplary embodiment of the present invention.

A vehicle 1 may be an apparatus driven by driving wheels for the purpose of transporting a person or goods, and may travel on a road. The vehicle 1 may include a body having an interior and an exterior, and a chassis in which machine apparatuses required for driving are installed as a remaining portion excluding the body.

As shown in FIG. 1, the exterior 110 of the body may include a front panel 111, a bonnet 112, a roof panel 113, a rear panel 114, a trunk 115, and front, rear, left and right doors 116, etc. The exterior 110 of the body may further include the front panel 111, the bonnet 112, the roof panel 113, the rear panel 114, the trunk 115, and window glasses 117 disposed in each of the front, rear, left and right doors 116, and pillars 118 disposed in the boundary of front, rear, left and right window glasses 117. Further, the window glasses 117 disposed in the front, rear, left and right doors 116 may further include side window glasses, quarter window glasses which may be installed between the pillars 118 and may be not open and close, a rear window glass installed in the rear side, and a front window glass installed in the front side.

The exterior 110 of the body may further include side minors 119 for providing a driver with a field of view of the rear side of the vehicle 1. The chassis of the vehicle 1 may include a power generation apparatus, a power transfer apparatus, a driving apparatus, a steering apparatus, a brake apparatus, a suspension apparatus, a transmission apparatus, a fuel apparatus, front, rear, left, and right wheels, etc. The vehicle 1 may further include various safety apparatuses for safety of a driver and a passenger. The safety apparatuses of the vehicle 1 may include various safety apparatuses such as an air bag control device for safety of the driver and the passenger during a vehicle collision, and an electronic stability control (ESC) device for stably controlling the attitude of the vehicle while accelerating and cornering, etc.

Further, the vehicle 1 may further include sensing devices such as a proximity sensor configured to sense obstacles or another vehicle of the rear or the side, and a rain sensor configured to sense rainfall and the amount of rainfall, etc. The vehicle 1 may include an electronic control unit (ECU) configured to operate the power generation apparatus, the power transfer apparatus, the driving apparatus, the steering apparatus, the brake apparatus, the suspension apparatus, the transmission apparatus, the fuel apparatus, the various safety apparatuses, and various sensors.

Further, the vehicle 1 may selectively include electronic devices such as a hands-free apparatus, a global positioning system (GPS), an audio device, and a Bluetooth apparatus, a rear imaging device, a terminal charge device, a Hi-pass device, etc., which are installed for driver convenience. The vehicle 1 may further include a start button configured to receive an input operation command to a start motor (not shown). In other words, the vehicle 1 may be configured to operate the start motor (not shown) when the start button is turned on, and drive an engine (not shown) which is the power generation apparatus by the operation of the start motor.

The vehicle 1 may further include a battery (not shown) electrically connected to a terminal, the audio device, a dome light, the start motor, and other electronic devices and may be configured to provide driving power. The battery may be configured to perform a charge using a self-generator or the power of the engine while driving. Further, the vehicle 1 may further include an antenna 130 installed in a roof panel 113 or a rear panel 114, and may be configured to receive a radio signal and a broadcasting signal.

As shown in FIG. 2, the antenna 130 may include a first communication unit 131 configured to perform radio frequency (RF) communication with a transmitter 2a of a server 2, and a second communication unit 132 configured to perform third generation (3G) mobile communication (3G), fourth generation (4G, LTE) mobile communication, or wireless fidelity (Wi-Fi) communication which is wireless communication of a predetermined band or greater with the transmitter 2a of the server 2, and may further include a third communication unit 133 configured to receive position information from each of a plurality of satellites through a plurality of global positioning systems (GPSs).

The antenna 130 may be configured to transmit image information of received broadcasting signal and position information of the GPS to the terminal 200. The antenna 130 may be disposed within the terminal 200. Further, the server 2 may be a device configured to transmit a broadcasting signal using the transmitter 2a, and transmit the broadcasting signal having the basic image information using the RF communication, etc. and the broadcasting signal having additional image information using the 3G or 4G mobile communication, etc. In particular, the basic image information may be image information obtained by sub-sampling original image information, and the additional image information may be image information obtained by subtracting image information obtained by up-sampling the basic image information from the original image information. In other words, the server 2 may be configured to obtain the basic image information by sub-sampling the original image information, obtain reference image information by up-sampling the basic image information, obtain the additional image information by subtracting the reference image information from the original image information, and transmit the basic image information and the additional image information.

As shown in FIG. 3, the interior 120 of the body may include a seat 121 (121a and 121b) in which a passenger sits, a dash board 122, an instrument panel (that is, a cluster) 123 disposed on the dash board 122 and in which a tachometer, a speedometer, a coolant temperature meter, a fuel gauge, a turn signal indicator light, a high beam indicator light, a warning light, a safety belt warning light, an odometer, an automatic shift selection lever indicator light, a door alarm warning light, an engine oil warning light, and a fuel shortage warning light may be installed, a steering wheel 124 configured to operate a direction of the vehicle 1, and a center fascia 125 in which a control panel of the audio device and the air conditioning device may be installed.

The seat 121 may include a driver seat 121a for a driver, a passenger seat 121b for a passenger, and rear seats disposed in the rear side inside the vehicle 1. The cluster 123 may be implemented by a digital method. The cluster 123 of the digital method may be configured to display vehicle information and driving information using an image. The center fascia 125 may include a head unit 140 disposed between the driver seat 121a and the passenger seat 121b in the dash board 122, and may be configured to operate the audio device, the air conditioning device, and a heat wire of the seat 121. In particular, the head unit 140 may include a plurality of button units 141 used for inputting an operation command for the audio device, the air conditioning device, and the heat wire.

An air outlet and a cigarette lighter may be installed in the center fascia 125. Further, the terminal 200 configured to receive user input information and output a result that corresponds to the input information may be installed in the center fascia 125. The terminal 200 may be operated by a controller and configured to perform at least one of a navigation function, a DMB function, an audio function, and a video function. In other words, the terminal 200 installed in the vehicle 1 may be a navigation (an audio, video, navigation (AVN)) device, or a terminal configured to perform communication in which a navigation application is installed.

In particular, the navigation device may be a device configured to calculate a current position of the vehicle based on position information received by the third communication unit 133 of the antenna 130, display the calculated current position by matching on map data which is previously stored, perform a path retrieval from the calculated current position to a destination based on a predetermined path retrieval algorithm by receiving the destination input from the user, display the retrieved path by matching on the map, and guide the user to the destination according to the path. The navigation device may be installed to be detachable on the dash board 122.

Figure 4:
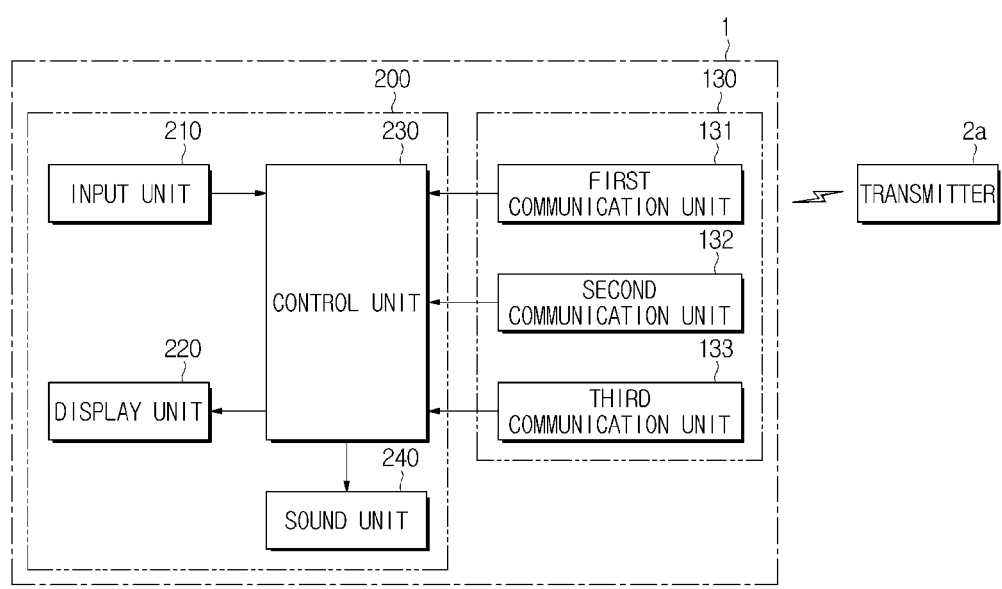
FIG. 4 is an exemplary diagram illustrating a control construction of a terminal according to one exemplary embodiment of the present invention.

FIG. 4 is an exemplary diagram illustrating a control construction of a terminal according to one exemplary embodiment of the present invention, and a control of a terminal disposed within the vehicle will be described. The terminal 200 of FIG. 4 may be a device configured to perform an image processing regarding received image information, and display the image-processed image, and will be described in detail.

As shown in FIG. 4, a terminal 200 may include an input unit 210, a display unit 220, a controller 230, and a sound unit 240. The controller 230 may be configured to operate the terminal 200 and the units thereof including the input unit 210, the display unit 220, and the sound unit 240. The input unit 210 may be configured to receive an input operation command of the terminal 200 from a user. In particular, the operation command may include commands for performing a DMB function, a navigation function, a CarPlay function, an audio function, a content playback function, a radio function, etc., and also may further include an adjustment command of each function and a power on and off command. The display unit 220 may be configured to display operation information of the terminal 200.

In particular, the operation information may include broadcasting image information when performing the DMB function, map and path guidance information when performing the navigation function, application information of an external device when performing the CarPlay function, a music list and play information when performing the audio function, content image information when performing the content playback function, and channel information when performing the radio function, etc.

The input unit 210 may be implemented as a button, a dial, a touch, and the display unit 220 may be implemented as a flat display panel such as a liquid crystal display (LCD), a plasma display panel (PDP), an organic light emitting display (OLED), etc. Further, the input unit 210 and the display unit 220 may be implemented as a touch screen type in which a flat display panel and a touch panel are integrally formed.

The controller 230 may be configured to determine a user's broadcasting watching intention in response to receiving a selection signal of a DMB button, confirm resolution of the display unit 220, operate the first communication unit 131 when the resolution of the display unit 220 is equal to or less than reference resolution, and display a broadcasting image on the display unit 220 based on the basic image information received by the first communication unit 131. The controller 230 may be configured to operate the first communication unit 131 and the second communication unit 132 when the resolution of the display unit 220 is greater than the reference resolution, perform image processing by combining the basic image information received by the first communication unit 131 and the addition image information received by the second communication unit 132, and display the broadcasting image on the display unit 220 based on the image-processed image information.

The reference resolution may be resolution of an image of the basic image information, and be resolution of about 320×240 (QVGA). Further, the resolution of the image-processed image information may be greater than the reference resolution and be resolution of about 640×480 (HD), and the image having this resolution may have an optimum image quality in the display unit 220 having a screen size of about 7, 8, or 9 inches.

Figure 5:
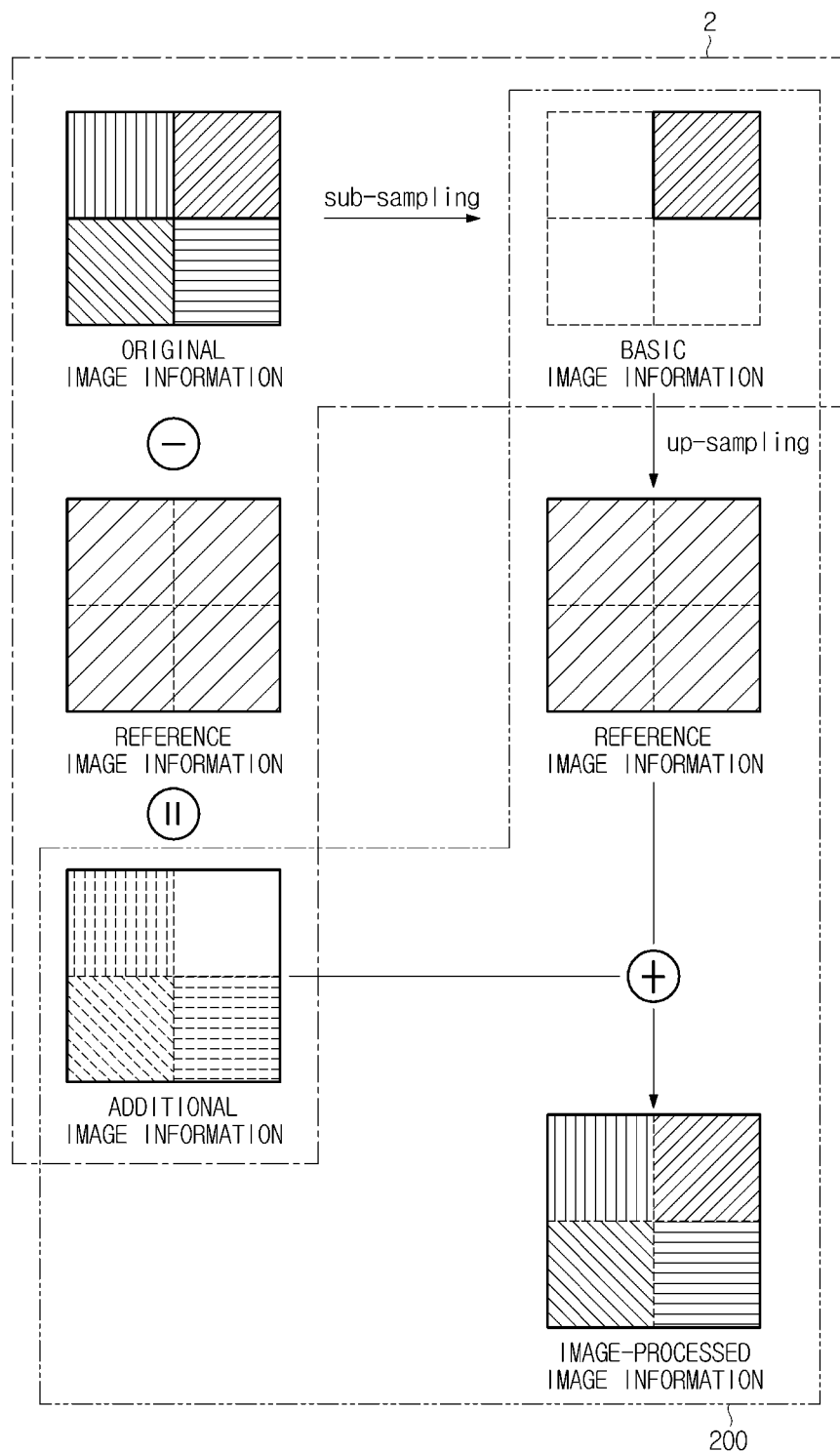
FIG. 5 is an exemplary diagram illustrating and an image processing of a server communicating with a terminal and a vehicle according to an exemplary embodiment of the present invention.

As shown in FIG. 5, when performing the image processing by combining the basic image information and the additional image information, the controller 230 may be configured to obtain the reference image information by up-sampling the basic image information, and perform the image processing by combining the additional image information to the obtained reference image information when the basic image information obtained by sub-sampling the original image is received and the additional image information is received.

Figure 6:
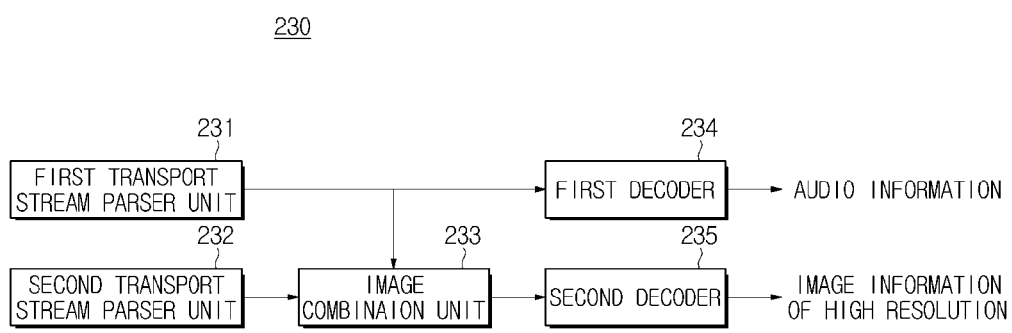
FIG. 6 is an exemplary detailed diagram illustrating a controller of a terminal according to one exemplary embodiment of the present invention.

Accordingly, the controller 230 may be configured to decode into the original image of high-resolution provided from the server 2. More specifically, as shown in FIG. 6, the controller 230 may include a first transport stream parser unit 231, a second transport stream parser unit 232, an image combination unit 233, a first decoder 234, and a second decoder 235.

The first transport stream parser unit 231 may be configured to separate audio information from the basic image information, output the separated audio information to the first decoder 234, and transmit the basic image information to the image combination unit 233. The first transport stream parser unit 231 may be configured to generate the reference image information by up-sampling the basic image information, and transmit the generated reference image information to the image combination unit 233.

The second transport stream parser unit 232 may be configured to separate the audio information from the additional image information, and transmit the additional image information in which the audio information is separated to the image combination unit 233. The image combination unit 233 may be configured to combine the basic image information in which the audio information is separated and the additional image information, and transmit the combined image information to the second decoder 235. Additionally, the image combination unit 233 may be configured to generate the reference image information by up-sampling the basic image information, and combine the generated reference image information and the additional image information when the first transport stream parser unit 231 transmits the basic image information. Further, the image combination unit 233 may be configured to combine the reference image information and the additional image information when the first transport stream parser unit 231 transmits the reference image information.

The first decoder 234 may be configured to decode the audio information separated from the basic image information, and output the decoded audio information to the sound unit 240. The second decoder 235 may be configured to decode the combined image information, and output the decoded image information to the display unit 220. The decoded image information may be image information of substantially high resolution. Further, a module for performing an image processing on the broadcasting signal of the terminal 200 may be installed within the head unit 140.

Additionally, the controller 230 may be configured to calculate a current position of a vehicle based on position information received by the third communication unit 133 when performing the navigation function, display the calculated current position by matching on map data which is previously stored, perform a path retrieval from the calculated current position toward the destination based on a predetermined path retrieval algorithm by receiving a destination input from the user, display the retrieved path by matching on a map, and guide the path toward the destination. The sound unit 240 may be configured to output a sound that corresponds to the audio information when watching the broadcasting. Further, the sound unit 240 may be configured to output a sound that corresponds to the navigation function, the radio function, the audio function, and the content playback function.

Figure 7:
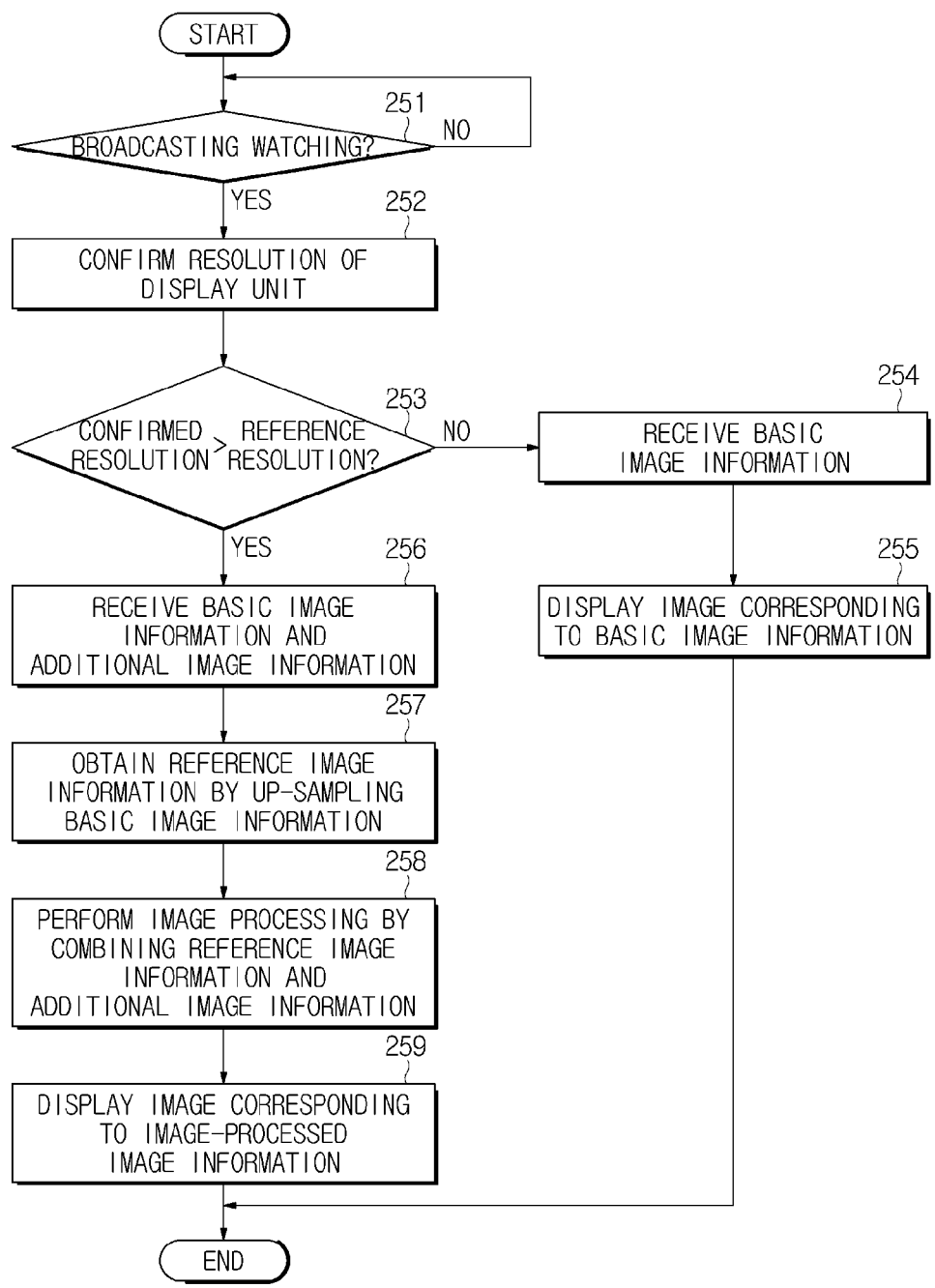
FIG. 7 is an exemplary flowchart for describing control of a terminal according to one exemplary embodiment of the present invention.

FIG. 7 is an exemplary flowchart for describing control of a terminal according to one exemplary embodiment of the present invention, and a control operation of the terminal disposed within the vehicle will be described. The terminal 200 may be configured to determine whether a broadcasting watching command is input (251), and confirm resolution of the display unit 220 in response to determining that the broadcasting watching command is input (252). In particular, the determination of whether the broadcasting watching command is input may include determining whether the selection signal of the DMB button of the input unit 210 is received, and may further include determining whether the selection signal of the DMB button of the button unit 141 of the head unit 140 is received.

The terminal 200 may be configured to compare the confirmed resolution and the reference resolution (253), and receive the basic image information when the confirmed resolution is equal to or less than the confirmed resolution (254). Further, the terminal 200 may be configured to decode the audio information after separating the audio information from the received basic image information, output the audio information through the sound unit 240, decode the basic image information in which the audio signal is separated, and display the decoded basic image information on the display unit 220 (255).

Moreover, the terminal 200 may be configured to receive the basic image information received by the first communication unit and the additional image information received by the second communication unit in response to determining that the resolution of the display unit 220 is greater than the reference resolution (256), and obtain the reference image information by up-sampling the received image information (257). The terminal 200 may further be configured to perform image processing by combining the reference image information and the addition image information (258), decode the image-processed image information, and display the decoded image information on the display unit 220 (259).

The terminal 200 may be configured to decode the audio information after separating the audio information from the basic image information, and output the decoded audio information through the sound unit 240. Further, the terminal 200 may be configured to display an image on the display unit 220 using necessary image information after receiving both the basis image information and the additional image information regardless of the resolution of the display unit 220. In particular, the reference resolution may be resolution of an image of the basic image information, and be resolution of about 320×240 (QVGA). Moreover, the resolution of the image-processed image information may be greater than the reference resolution and be resolution of about 640×480 (HD), and the image having this resolution may have an optimum image quality in the display unit 220 having a screen size of about 7, 8, or 9 inches.

Figure 8:
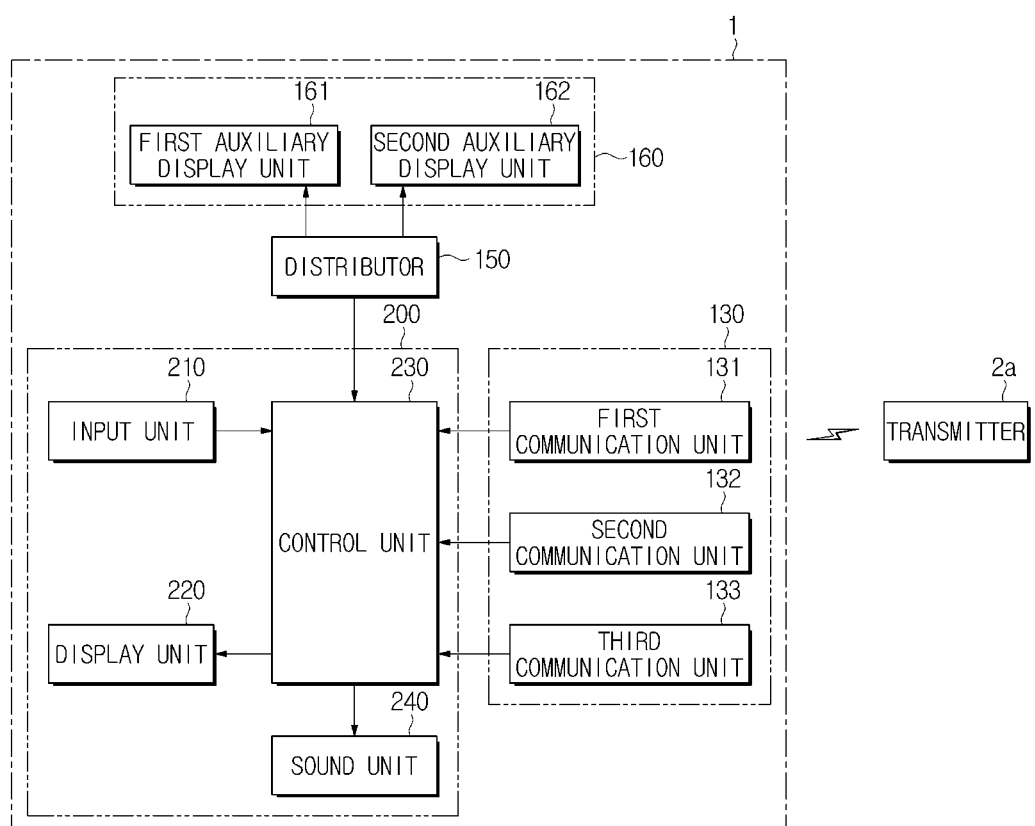
FIG. 8 is an exemplary diagram illustrating a control construction of a terminal according to another exemplary embodiment of the present invention.

FIG. 8 is an exemplary diagram illustrating a control method of a vehicle having a terminal according to another exemplary embodiment of the present invention. The vehicle 1 may include an antenna 130 and a terminal 200, and further include a distributor 150, and an auxiliary display unit 160. Since the antenna according to another exemplary embodiment of the present invention has the same construction as the antenna of FIG. 4, description thereof will be omitted. The vehicle 1 may further include the auxiliary display unit 160 in addition to the display unit 220 of the terminal 200 disposed on the center fascia. In other words, the vehicle 1 may further include a first auxiliary display unit 161 disposed on the rear surface of the driver seat, and a second auxiliary display unit 162 disposed on the rear surface of the passenger seat.

Further, the vehicle 1 may include either the first auxiliary display unit 161 disposed on the rear surface of the driver seat, or the second auxiliary display unit 162 disposed on the rear surface of the passenger seat. Since the vehicle 1 according to another exemplary embodiment of the present invention has the same construction as the vehicle 1 of FIG. 1, description thereof will be omitted. The terminal 200 according to another exemplary embodiment of the present invention may include an input unit 210, a display unit 220, a controller 230, and a sound unit 240.

Since the input unit 210, the display unit 220, the controller 230, and the sound unit 240 included in the terminal 200 according to another exemplary embodiment of the present invention have the same construction as those according to one exemplary embodiment of the present invention, description thereof will be omitted.

The controller 230 may be configured to determine as a user broadcasting watching intention in response to receiving a selection signal of the DMB button, confirm resolution of the display unit 220, operate the first communication unit 131 in response to determining that the resolution of the display unit 220 is equal to or less than the reference resolution, and display a broadcasting image on the display unit 220 based on the basic image information received by the first communication unit 131. The controller 230 may be configured to operate the first communication unit 131 and the second communication unit 132 in response to determining that the resolution of the display unit 220 is greater than the reference resolution, perform image processing by combining the basic image information received by the first communication unit 131 and the additional image information received by the second communication unit 132, and display the broadcasting image on the display unit 220 based on the image-processed image information.

The controller 230 may further be configured to determine the auxiliary display unit 160 which may be additionally installed in addition to the display unit 220 of the terminal 200 which may be a main display unit in response to receiving a broadcasting watching command input, confirm resolution of the auxiliary display unit 160 in response to determining the auxiliary display unit 160, and transmit the basic image information to the distributor 150 when the resolution of the auxiliary display unit 160 is equal to or less than the reference resolution. The controller 230 may be configured to transmit the image-processed image information to the distributor 150 when the resolution of the auxiliary display unit 160 is greater than the reference resolution. In addition, the controller 230 may be configured to directly transmit the image information to one auxiliary display unit when there is one auxiliary display unit within the vehicle 1.

The distributor 150 may be configured to distribute the basic image information or the image-processed image information transmitted from the controller 230, and transmit the distributed image information to the first auxiliary display unit 161 and the second auxiliary display unit 162. The first auxiliary display unit 161 and the second auxiliary display unit 162 may be configured to display an image that corresponds to the image information transmitted from the distributor 150. In particular, the image information transmitted from the distributor 150 may be the basic image information or the image-processed image information.

Further, the terminal 200 may be configured to transmit the basic image information to the distributor 150 when the resolution of the first auxiliary display unit 161 is equal to or less than the reference resolution and the resolution of the second auxiliary display unit 162 is greater than the reference resolution. The first auxiliary display unit 161 and the second auxiliary display unit 162 may be configured to output the image that corresponds to the basic image information. Further, the terminal 200 may be configured to output the basic image information on the first auxiliary display unit 161, and output the image-processed image information on the second auxiliary display unit 162, when the resolution of the first auxiliary display unit 161 is equal to or less than the reference resolution and the resolution of the second auxiliary display unit 162 is greater than the reference resolution.

Additionally, the first auxiliary display unit 161 may be configured to display the image that corresponds to the basis image information, and the second auxiliary display unit 162 may be configured to display the image that corresponds to the image-processed image information.

Figure 9:
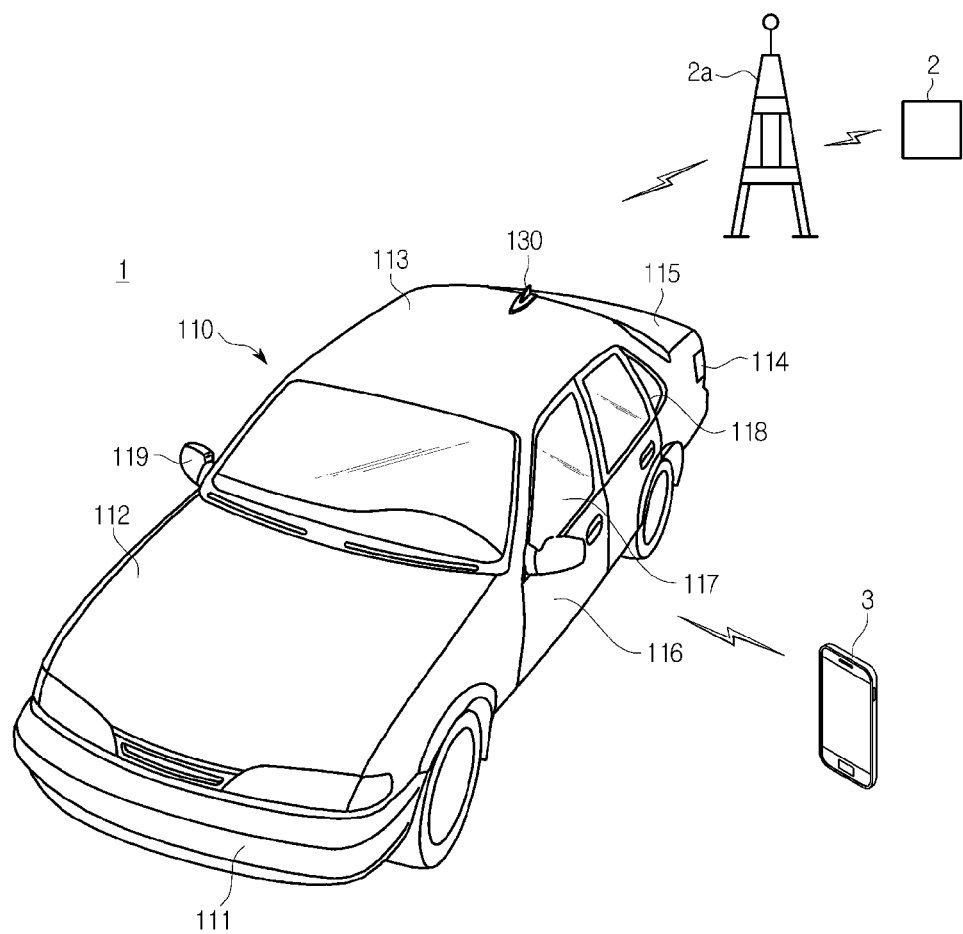
FIG. 9 is an exemplary diagram illustrating a vehicle in which a terminal is provided according to another exemplary embodiment of the present invention.
Figure 10:
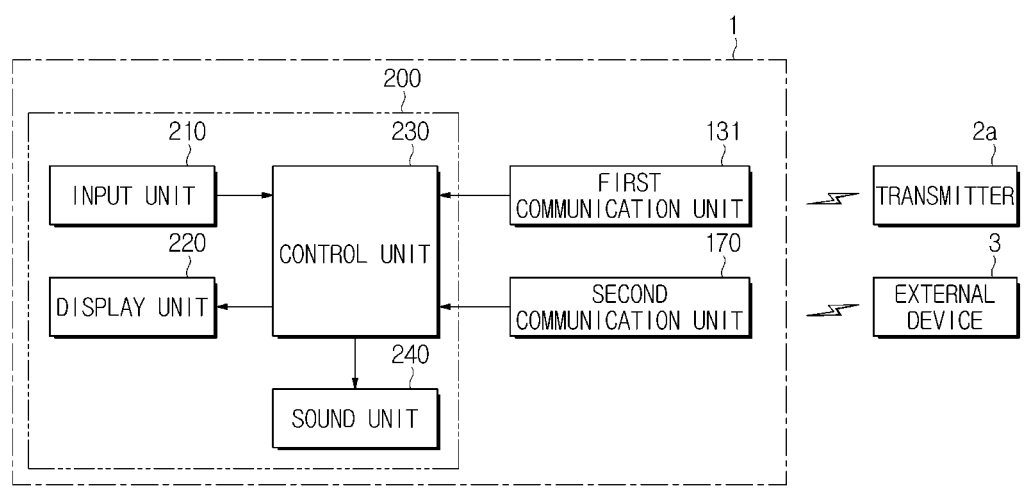
FIG. 10 is an exemplary diagram illustrating a control construction of a terminal according to still another exemplary embodiment of the present invention.

FIG. 9 is an exemplary diagram illustrating a vehicle in which a terminal is provided according to another exemplary embodiment of the present invention, FIG. 10 is an exemplary diagram illustrating a control construction of a terminal according to still another exemplary embodiment of the present invention, and a control method of the terminal 200 disposed within the vehicle 1 will be described.

The vehicle 1 may include an antenna 130 disposed in a roof panel 113 or a rear panel 114, and may be configured to receive a radio signal and a broadcasting signal. The antenna 130 may include a first communication unit 131 configured to perform radio frequency (RF) communication with a transmitter 2a of a server 2. The antenna 130 may further include a GPS receiver (corresponding to the third communication unit according to one exemplary embodiment of the present invention) configured to receive position information from each of a plurality of satellites using a plurality of GPSs.

The antenna 130 may be configured to transmit image information of the received broadcasting signal and the position information of the GPS to the terminal 200. The antenna 130 may be disposed within the terminal 200. In particular, the server 2 may be a device configured to transmit the broadcasting signal using the transmitter 2*a*, and transmit the broadcasting signal having the basic image information using the RF communication, etc. and the broadcasting signal having the additional image information using the 3G and 4G mobile communication, etc.

The basic image information may be image information obtained by sub-sampling the original image information, and the additional image information may be image information obtained by subtracting image information obtained by up-sampling the basic image information from the original image information. In other words, the server 2 may be configured to obtain the basic image information by sub-sampling the original image information, obtain the reference image information by up-sampling the basic image information, obtain the addition image information by subtracting the reference image information from the original image information, and transmit the basic image information and the additional image information using the transmitter 2*a*.

The vehicle 1 may further include a second communication unit 170 configured to perform communication between the terminal 200 and the external device 3. The second communication unit 170 may be configured to transmit the additional image information transmitted from the external device 3 to the terminal 200. The second communication unit 170 may include at least one communication device among an interface device having a universal serial bus (USB) port disposed within the vehicle 1, a Bluetooth device disposed within the vehicle 1, and a Wi-Fi access point device.

Further, the terminal 200 may further include the USB port, etc., and thus may be configured to directly receive the additional image information from the external device 3. In particular, the external device 3 may be a smart phone, a tablet PC, a notebook, etc., configured to perform at least one communication among USB communication, Bluetooth communication, and Wi-Fi access point communication, and perform communication with the vehicle 1. Further, the external device 3 may be a device configured to perform the 3G and 4G mobile communications, and receive the additional image information from the server 2. Accordingly, the external device 3 may be configured to provide the additional image information to terminal 200 after receiving the additional image information from the server 2. Particularly, a protocol of image information for transmitting and receiving the additional image information may be previously set. Since the vehicle 1 according to another exemplary embodiment of the present invention has the same construction as the vehicle 1 of FIG. 1, description thereof will be omitted.

The terminal 200 according to still another exemplary embodiment of the present invention may be configured to perform at least one among a navigation function, a DMB function, an audio function, and a video function. In other words, the terminal 200 installed within the vehicle 1 may be a terminal in which the navigation (AVN) device, or a terminal configured to communicate in which the navigation application is installed. In particular, the navigation device may a device configured to calculate a current position of the vehicle based on position information received by the GPS receiver of the antenna 130, display the calculated current position by matching on map data which is previously stored, perform a path retrieval from the calculated current position to a destination based on a predetermined path retrieval algorithm by receiving a destination input from the user, display the retrieved path by matching on the map, and guide the user toward the destination according to the path. The navigation device may be installed to be detachable on the dash board 122. The terminal 200 may be a device configured to perform an image processing on image information received by the first communication unit 131 and the second communication unit 132, and display the image-processed image, and will be described in detail.

As shown in FIG. 10, the terminal 200 may include an input unit 210, a display unit 220, a controller 230, and a sound unit 240. Since the input unit 210, the display unit 220, the controller 230, and the sound unit 240 included in the terminal 200 according to still another exemplary embodiment of the present invention have the same construction as those according to one exemplary embodiment of the present invention, description thereof will be omitted.

The controller 230 may be configured to determine as a user broadcasting watching intention in response to receiving a selection signal of the DMB button, confirm resolution of the display unit 220, operate the first communication unit 131 in response to determining that the resolution of the display unit 220 is equal to or less than the reference resolution, and display a broadcasting image on the display unit 220 based on the basic image information received by the first communication unit 131.

The controller 230 may be configured to request data communication to the external device 3 by operating the second communication unit 132 in response to determining that the resolution of the display unit 220 is greater than the reference resolution, receive the additional image information transmitted from the external device 3 when the data communication is approved from the external device 3, process an image by combining the basic image information received by the first communication unit 131 and the additional image information received by the second communication unit 132, and display a broadcasting image on the display unit 220 based on the image-processed image information. In other words, the controller 230 may be configured to combine the basic image information and the additional image information, obtain the reference image information by up-sampling the basic image information when the basic image information obtained by sub-sampling the original image information is received and the additional image information is received when processing the image, and perform an image processing of combining the obtained reference image information and the additional image information. Since an image processing construction of the controller 230 is the same as that of FIG. 6, description will be omitted.

The controller 230 may further be configured to confirm the amount of first data available through the external device 3 while performing communication with the external device 3, confirm the amount of second data of the additional image information to be received, compare the amount of the first data and the amount of the second data, confirm a time when the amount of the first data becomes less than the amount of the second data, and output exhausted information of the amount of data of the external device 3 prior to a predetermined time from the confirmed time.

Further, the controller 230 may be configured to compare the amount of data provided from the external device 3 set by the user and the amount of data of the additional image information to be received. Moreover, the controller 230 may be configured to compare the amount of remaining data of the external device 3 set by the user and the amount of data of the additional image information to be received. The controller 230 may also be configured to terminate the broadcasting watching in response to receiving a data blocking command input by the user. In addition, the controller 230 may be configured display an image that corresponds to the basic image information in response to receiving a continuous watching command input after receiving the data blocking command input.

Figure 11:
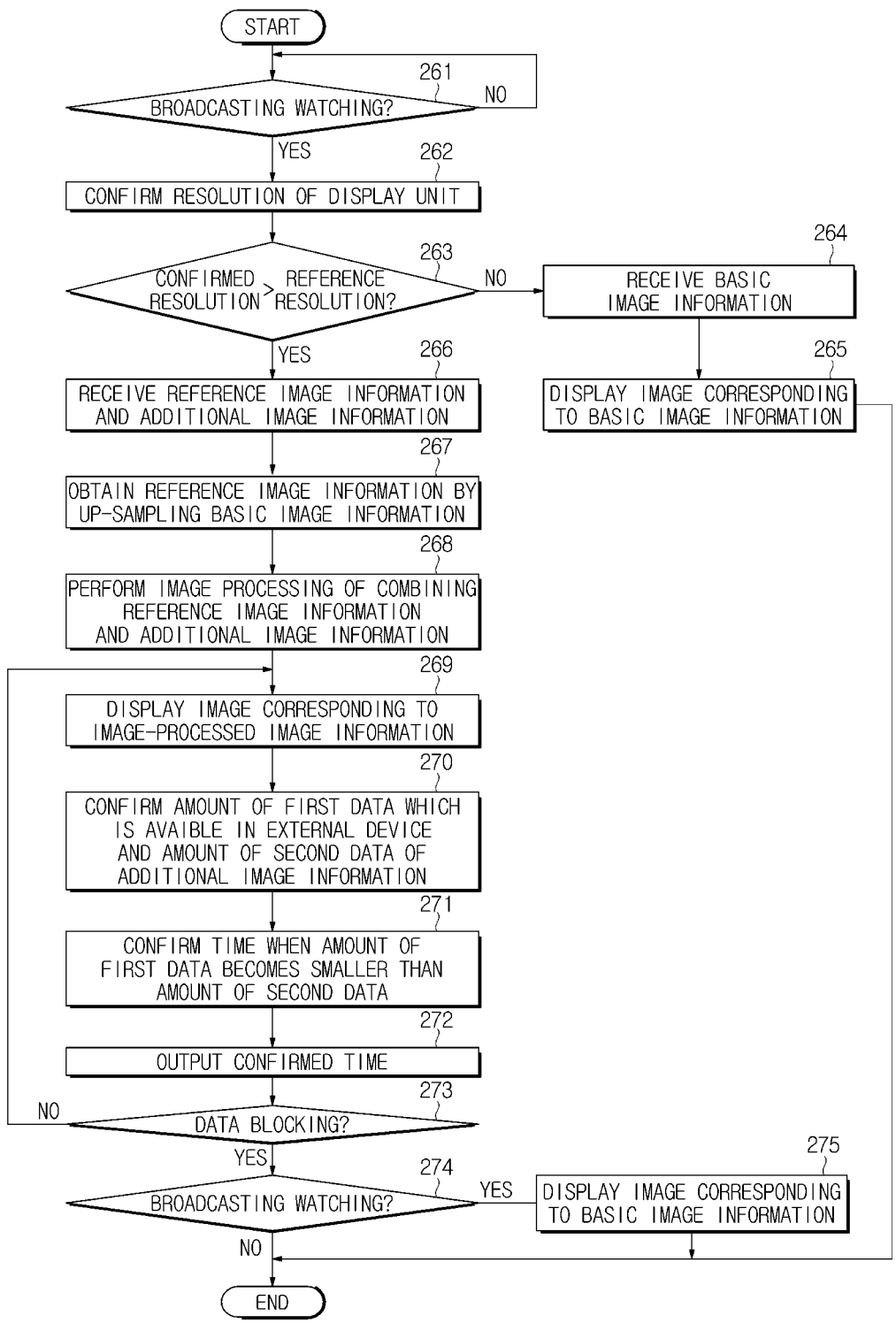
FIG. 11 is an exemplary flowchart for describing control of a terminal according to another exemplary embodiment of the present invention.

FIG. 11 is an exemplary flowchart for describing control of a terminal according to exemplary another embodiment of the present invention, and a control method of the terminal disposed within the vehicle 1 will be described. The terminal 200 may be configured to determine whether the broadcasting watching command is input (261), and confirm resolution of the display unit 220 in response to determining that the broadcasting watching command is input (262).

In particular, the determination of whether the broadcasting watching command is input may include determining whether the selection signal of the DMB button disposed in the input unit 210 is received, and further include determining whether the selection signal of the DMB button disposed in the button unit 141 of the head unit 140 is received. The terminal 200 may be configured to compare the confirmed resolution and the reference resolution (263), and receive the basic image information through the first communication unit 131 when the confirmed resolution is equal to or less than the reference resolution (264).

The terminal 200 may be configured to decode the audio information after separating the audio information from the received basic image information, output the decoded audio information to the sound unit 240, decode the basic image information in which the audio information is separated, and display the decoded basic image information on the display unit 220 (265). Additionally, the terminal 200 may be configured to receive the basic image information received by the first communication unit 131 and the additional image information received by the second communication unit 170 when the resolution of the display unit 220 is greater than the reference resolution (266), and obtain the reference image information by up-sampling the received basic image information (267).

In particular, the receiving of the additional image information received by the second communication unit 170 may include displaying a message that requests data communication with the external device 3, and receiving the additional image information received in the external device 3 via the second communication unit 170 when the communication with the external device 3 is performed. The external device 3 may be configured to receive the additional image information from the server 2 using the 3G or 4G mobile communication, and transmit the received additional image information to the second communication unit 170.

Figure 12:
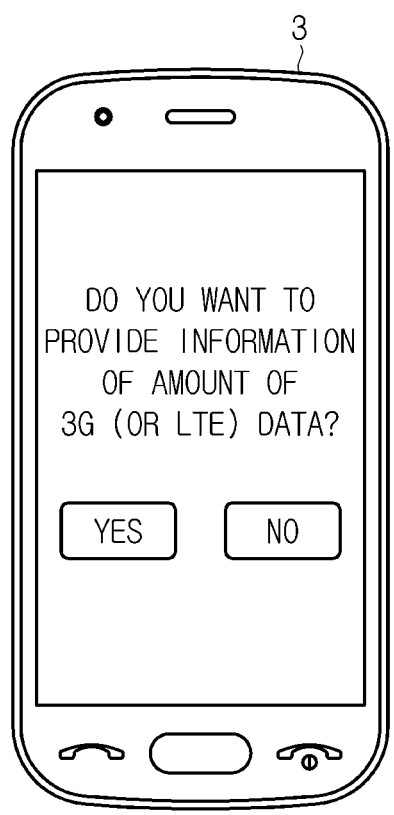
FIG. 12 is an exemplary diagram illustrating display of an external device communicating with a terminal according to an exemplary embodiment of the present invention.

As shown in FIG. 12, the external device 3 may be configured to display a message asking whether to provide an amount of data available for free or at a reduced cost in the external device 3 when performing communication with the terminal 200, provide the amount of data which is available when a "Yes" button is input by the user, and transmit the additional image information regardless of the amount of data provided to the terminal when a "No" button is input.

Furthermore, the terminal 200 may be configured to perform image processing by combining the reference image information and the additional image information (268), decode the image-processed image information, and display the decoded image information on the display unit 220 (269). The terminal 200 may be configured to decode the audio information after separating the audio information from the basic image information, and output the decoded audio information through the sound unit 240.

The terminal 200 may further be configured to confirm the amount of first data available through the external device 3 while displaying the image-processed image of high resolution when information regarding the amount of the first data available is provided from the external device 3, and confirm the amount of second data of the additional image information to be received (270). The terminal 200 may also be configured to compare the amount of the first data and the amount of the second data, confirm a time when the amount of the first data becomes less than the amount of the second data (271), and output the confirmed time (272). In particular, the outputting of the confirmed time may include outputting a time prior to a predetermined time from the confirmed time.

Figure 13:
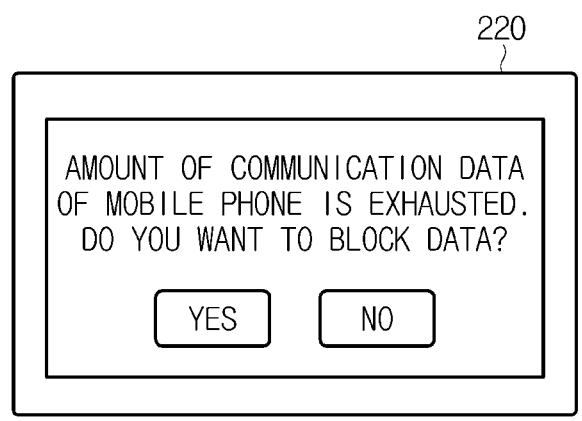
FIGS. 13 and 14 are exemplary diagrams illustrating display of a terminal, and information display when communicating with an external device according to an exemplary embodiment of the present invention.

As shown in FIG. 13, the terminal 200 may be configured to output exhausted information of the amount of data available in the external device 3. The message of asking data blocking of the external device 3 may be output together. The terminal 200 may be configured to determine whether the data blocking command is input (273), and display an image of high resolution by continuously receiving the additional image information from the external device 3 in response to receiving no data blocking command input.

In particular, the determination of whether the data blocking command is input may include determining whether the "No" button is selected, or the "Yes" button is selected in response to the message of asking the data blocking being output. The terminal 200 may be configured to determine whether the continuous watching command is input after blocking the communication with the external device in response to determining that the data blocking command is input (274), that is, in response to receiving the data blocking command input.

Figure 14:
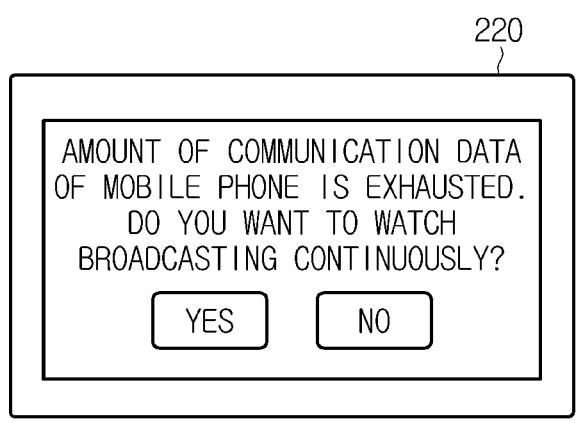

As shown in FIG. 14, the terminal 200 may be configured to display a message of asking continuous watching, that is, requesting a confirmation of a user for continuous output of the broadcasting. The terminal 200 may be configured to display an image using the basic image information received by the first communication unit 131 in response to receiving the continuous watching command input (275), and terminate the broadcasting watching when the continuous watching command is not input. In particular, the determination of whether the continuous watching command is input may include determining whether the "No" button is selected, or the "Yes" button is selected in response to the message of asking the continuous watching displayed on the display unit 220.

Accordingly, the resolution of the broadcasting image may be improved by displaying an image obtained by combining the basis image information and the additional image information after receiving the basic image information using the communication unit disposed within the vehicle 1 and receiving the additional image information using the external device 3.

The present invention may provide the broadcasting image of high resolution to the user since the resolution of the DMB of the terminal may be increased by receiving the additional image information to improve the resolution via a communication network such as the 3G or LTE. Further, the present invention may increase the resolution of the DMB of the terminal by receiving the additional image information to improve the resolution from the external device via the communication with the external device. Moreover, the present invention may allow the user to suitably use the amount of data with a fee by providing information regarding the amount of data of the external device when receiving the additional image information from the external device. Accordingly, the present invention may increase merchantability by improving a quality of the terminal and the vehicle.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A terminal, comprising:
    a display unit;
    a first communication unit configured to receive basic image information;
    a second communication unit configured to receive additional image information; and
    a controller configured to:
        up-sample the basic image information,
        combine the up-sampled image information and the additional image information,
        display an image on the display unit based on the combined image information when
    a resolution supported in the display unit is greater than a resolution of the basic image information,
        display the image on the display unit based on the basic image information when the resolution supported in the display unit is equal to or less than the resolution of the basic image information,
        determine an amount of first data available through the second communication unit,
        determine an amount of second data of the additional image information to be received,
        output data blocking information when the amount of the first data becomes less than the amount of the second data,
        determine whether a coninuous watching command is input when a data blocking command is selected,
        display the image on the display unit based on the basid image information when the continuous watching command is input, and
        terminate a broadcasting watching when the continuous watching command is not input,
    wherein the additional image information is image information obtained by subtracting the up-sampled image information from original image information, and the basic image information is image information obtained by sub-sampling the original image information.

2. The terminal according to claim 1, wherein the first communication unit is configured to radio frequency (RF) communication.

3. The terminal according to claim 1, whether the second communication unit is configured to perform wireless communication of a predetermined band or greater with a transmitter of a server.

4. The terminal according to claim 1, whether the second communication unit is configured to perform Bluetooth communication, universal serial bus (USB) communication, or Wi-Fi access point communication with an external device.

5. The terminal according to claim 1, wherein the controller is further configured to continuously receive the additional image information from the second communication unit when the data blocking command is not selected, combine the up-sampled image information and the received additional image information, and display an image on the display unit based on the combined image information.

6. A vehicle, comprising:
    an antenna including a first communication unit configured to communicate with a transmitter that transmits a broadcasting signal and receive basic information and a second communication unit configured to communicate with the transmitter and perform another communication with the first communication unit; and
    a terminal configured to:
        receive the basic image information and additional image information,
        up-sample the basic image information,
        perform image processing by combining the up-sampled image information and the additional image information,
        display an image that corresponds to the image-processed image information on a display unit when a resolution supported in the display unit is greater than a resolution of the basic image information;
        display the image on the display unit based on the basic image information when the resolution supported in the display unit is equal to or less than the resolution of the basic image information,
        determine an amount of first data available through the second communication unit,
        determine an amount of second data of the additional image information to be received,
        output data blocking information when the amount of the first data becomes less than the amount of the second data,
        determine whether a continuous watching command is input when a data blocking command is selected,
        display the image on the display unit based on the basic image information when the continuous watching command is input, and
        terminate a broadcasting watching when the continuous watching command is not input,
    wherein the additional image information is image information obtained by subtracting the up-sampled image information from original image information, and the basic image information is image information obtained by sub-sampling the original image information.

7. The vehicle according to claim 6, wherein the first communication unit is configured to perform radio frequency (RF) communication with the transmitter, and the second communication unit is configured to perform wireless communication of a predetermined band or greater with the transmitter.

8. A vehicle, comprising:
    a first communication unit configured to communicate with a transmitter that transmits a broadcasting signal and receive basic image information;
    a second communication unit configured to perform communication with an external device, and receive additional image information from the external device; and
    a terminal configured to:
        up-sample the basic image information,
        perform image processing by combining the up-sampled image information and the additional image information,
        display an image that corresponds to the image-processed image information on a display unit when a resolution supported in the display unit is greater than a resolution of the basic image information,
        display the image on the display unit based on the basic image information when the resolution supported in the display unit is equal to or less than the resolution of the basic image information,
determine an amount of first data available through the external device,
determine an amount of second data of the additional image information to be received,
output data blocking information when the amount of the first data becomes less than the amount of the second data,
determine whether a continuous watching command is input when a data blocking command is selected,
cut off communication with the external device,
display the image on the display unit based on the basic image information when the continuous watching command is input, and
terminate a broadcasting watching when the continuous watching command is not input,
wherein the additional image information is image information obtained by subtracting the up-sampled image information from original image information, and the basic image information is image information obtained by sub-sampling the original image information.

9. The vehicle according to claim 8, wherein the first communication unit is configured to perform radio frequency (RF) communication, and the second communication unit is configured to perform Bluetooth communication, universal serial bus (USB) communication, or Wi-Fi access point communication with an external device.

10. The vehicle according to claim 8, wherein the terminal is further configured to determine a time when the amount of the first data becomes less than the amount of the second data, and output the confirmed time through the display unit.

11. The vehicle according to claim 8, wherein the terminal is further configured to continuously receive the additional image information from the second communication unit when the data blocking command is not selected.

12. The vehicle according to claim 8, further comprising:
an auxiliary display unit arranged on the rear surface of each of a driver seat and a passenger seat; and
a distributor configured to distribute an image transmitted to the auxiliary display unit.

13. A method of controlling a terminal disposed within a vehicle, comprising:
confirming, by a controller, a resolution of a display unit in response to receiving a broadcasting watching command input;
receiving, by the controller, basic image information;
displaying, by the controller, an image that corresponds to the basic image information on the display unit when the confirmed resolution is equal to or less than a resolution of the basic image information;
up-sampling, by the controller, the basic image information;
combining, by the controller, the up-sampled image information and additional image information received by an external device when the confirmed resolution is greater than the resolution of the basic image information;
displaying, by the controller, an image that corresponds to the combined image information on the display unit when the confirmed resolution is greater than the resolution of the basic image information;
determining an amount of the first data available through the second communication unit;
determining an amount of the second data of the additional image information to be received;
outputting data blocking information when the amount of the first data becomes less than the amount of the second data;
determining whether a continuous watching command is input when a data blocking command is selected;
cutting communication with the external device and displaying the image on the display unit based on the basic image information when the continuous watching command is input; and
terminating a broadcasting watching when the continuous watching command is not input,
wherein the additional image information is image information obtained by subtracting the up-sampled image information from original image information, and the basic image information is image information obtained by sub-sampling the original image information.

14. The method of controlling the terminal according to claim 13, wherein the basic image information is information received via radio frequency (RF) communication, and the additional image information is information received via wireless communication of a predetermined band or greater.

15. The method of controlling the terminal according to claim 13, the basic image information is information received via RF communication, and the additional image information is information received via Bluetooth communication, universal serial bus (USB) communication, or Wi-Fi access point communication with an external device.

16. The method of controlling the terminal according to claim 15, further comprising:
continuously receiving the additional image information from the external device when the data blocking command is not selected.

* * * * *